United States Patent [19]

Nagata et al.

[11] Patent Number: 4,823,126

[45] Date of Patent: Apr. 18, 1989

[54] DISPLAY DEVICE AND A DISPLAY METHOD

[75] Inventors: Seiichi Nagata, Sakai; Sadayoshi Hotta, Hirakata; Etsuya Takeda; Yutaka Miyata, all of Hirakata, Japan

[73] Assignee: Matsushita Electric Industrial Co. Ltd., Kadoma, Japan

[21] Appl. No.: 91,350

[22] Filed: Aug. 28, 1987

Related U.S. Application Data

[63] Continuation-in-part of Ser. No. 849,524, Apr. 8, 1986, abandoned.

[30] Foreign Application Priority Data

Apr. 12, 1985 [JP] Japan ................................ 60-77645

[51] Int. Cl.$^4$ ................................ H04Q 1/00

[52] U.S. Cl. ................................ 340/825.79; 340/825.91; 340/719

[58] Field of Search ................ 340/718, 719, 784, 789, 340/825.79, 825.26, 825.91, 760, 825.9, 825.8; 365/200, 225, 103–105, 201

[56] References Cited

U.S. PATENT DOCUMENTS

| | | | |
|---|---|---|---|
| 3,624,609 | 11/1971 | Weckler | 340/825.86 |
| 3,913,090 | 10/1975 | Fischer | 340/719 |
| 4,047,163 | 9/1977 | Choate et al. | 365/201 X |
| 4,092,733 | 5/1978 | Coontz et al. | 365/200 |
| 4,110,662 | 8/1978 | Greeneich et al. | 340/719 |
| 4,237,456 | 12/1980 | Kanatani | 340/719 |
| 4,429,305 | 1/1984 | Hosokawa et al. | 340/719 X |
| 4,447,812 | 5/1984 | Soneda et al. | 340/718 X |

FOREIGN PATENT DOCUMENTS

| | | |
|---|---|---|
| 56-90497 | 7/1981 | Japan . |
| 56-153587 | 11/1981 | Japan . |
| 56-153588 | 11/1981 | Japan . |
| 56-153589 | 11/1981 | Japan . |

*Primary Examiner*—Ulysses Weldon
*Attorney, Agent, or Firm*—Wenderoth, Lind & Ponack

[57] ABSTRACT

A display device includes; a first group of bus lines for transmitting a display signal; a second group of bus lines for transmitting a scan signal and a display unit formed at an intersecting point between the first bus line and the second bus line. The first group and the second group of bus lines are formed in a matrix. The display device further includes switching elements which are selectively opened or closed, the switching elements being provided between the bus lines in the first group or in the second group. Accordingly, even when one of the bus lines is broken, a signal can be supplied from the other bus line to the broken bus line through this switching element.

6 Claims, 3 Drawing Sheets

DISPLAY DEVICE AND A DISPLAY METHOD

This application is a continuation-in-part of now abandoned application Ser. No. 849,524, filed Apr. 8, 1986.

BACKGROUND OF THE INVENTION

1. Field of the Invention

The present invention generally relates to a display device and more particularly, to a matrix-type display device.

2. Description of the Prior Art

Generally, the matrix-type display device referred to above has an advantageous feature in that it can be formed flat because it has a display unit provided at an intersection between a line electrode bus and a row electrode bus. However, in this matrix-type display device, an interruption or a breaking of a bus would cause trouble in that a plurality of display elements connected to the interrupted or broken bus are rendered inoperative thereby giving rise to an erroneous disconnection of the display lines. The erroneous disconnection of the display lines is a fatal damage to the display device, and accordingly, a display device having a broken bus, even a single one, must be discarded as a defective device. In view of this, the following prior art techniques have been already proposed in order to reduce the bad influence of the breaking of a bus as stated above.

(1) A bus transmitting the same signal is provided in duplicate.

This method is based on the fact that a defect can be backed up and compensated for with the duplicated function if the necessary functions are duplicated. In general, spare lines are provided for countermeasures against the breaking of the bus lines. The Japanese Laid-Open Patent Publications (unexamined) Tokkaisho Nos. 56-90497, 56-153588, 56-153589, etc. disclose a method for providing the bus in duplicate.

(2) A first bus material is layered with a second bus material.

For example, in a liquid crystal display device driven by a thin film transistor (TFT), if the bus material transmitting a scanning signal is layered with the bus material transmitting a display signal, electricity can be transmitted through the layer of another bus material even in the case where one layer is defective.

(3) A bus is overlapped with a driving part which transmits a signal to the bus.

This method disclosed in the Japanese Laid-Open Patent Publication (unexamined) Tokkaisho No. 56-153587 is considered effective particularly when the display part is integrally combined with the driving part. However, in the case that the driving part and the display part and manufactured separately and then connected to each other, the number of mounting operations is undesirably increased.

Since the breaking of the bus raises a very serious problem on the matrix-type display device which has a large number of display picture elements, various kinds of methods have been contrived heretofore so as to solve the problem. According to the above-described first prior art (1), spare lines which are originally not necessary for the display device are provided. Therefore, it is disadvantageous for a display device of a transparent type in that the area which light passes through, that is, the opening ratio is inevitably reduced to render the display dark. The second prior art (2) relates to how the breaking of the line can be prevented from taking place. To carry out the method according to this prior art, it is necessary to open a window for connections of the bus materials, therefore requiring that, with consideration as to the minimum width necessary for opening the window, the bus itself must be larger than that needed in the case of a display device without a contact window. As a result of this, the opening ratio is reduced. Moreover, it is impossible from the viewpoint of the principle that both materials are layered one by one in the thin film transistor. Therefore, the second method has no effect with respect to the breaking of a line in the thin film transistor. The third method is useful particularly when a special material is employed so that the display part can be integrally layered with the driving part. In other words, when the necessary frequency for treating the related circuits is taken into consideration, the material to be employed in the third method is restricted to one which has a large electron mobility. Although it is possible to form a thin film transistor of the display part with amorphous silicon or polysilicon, etc. which is generally used as a material for the thin film transistor, it is impossible at present to form the driving part which can perform signal treating. Thus, the third method cannot be applied when a material such as amorphous silicon or polysilicon, etc. is used, and it is inconvenient should the driving part and the display part be manufactured separately and individually so as to be connected to each other later. In this case, the number of connections, namely, the number of mountings is considerably increased.

SUMMARY OF THE INVENTION

Accordingly, an essential object of the present invention is to provide an improved display device which is so arranged in simple construction that a correct right signal can be applied to a subject display unit even when a corresponding bus is broken, with only a small possibility that the display lines become defective.

In accomplishing this object, according to the present invention, there is provided a display device which comprises a first group of bus lines for transmitting display signals, a second group of bus lines for transmitting scanning signals, and display units formed at an intersection between a bus line of the first group of bus lines and a bus line of the second group of bus lines. In the display device of the present invention, a switch means which is selectively opened or closed is provided between two bus lines so that a signal supplied to one end of either one of the two bus lines can be transmitted to the other bus line from the one bus line. Accordingly, a plurality of bus lines can be connected to each other, and moreover, a plurality of bus lines can be added simultaneously at one time with the same signal.

Accordingly, in the display device of the present invention having the construction as described above, even in the case that a particular bus line is broken or interrupted, a signal can be transmitted through another bus line which is not broken. As a result, a correct display signal is added to each of the display elements. Therefore, the display device of the present invention is advantageous in that even the display unit belonging to the broken bus line can be correctly driven by the detoured display signal, resulting in an effective restriction in the generation of defective display lines.

BRIEF DESCRIPTION OF THE DRAWINGS

This and other objects and features of the present invention will become apparent from the following description taken in conjunction with preferred embodiments thereof with reference to the accompanying drawings, in which.

Before the description of the present invention proceeds, it is to be noted that like parts are designated by like reference numerals throughout the accompanying drawings.

DETAILED DESCRIPTION OF THE EMBODIMENTS

Embodiment 1

Figure 1:
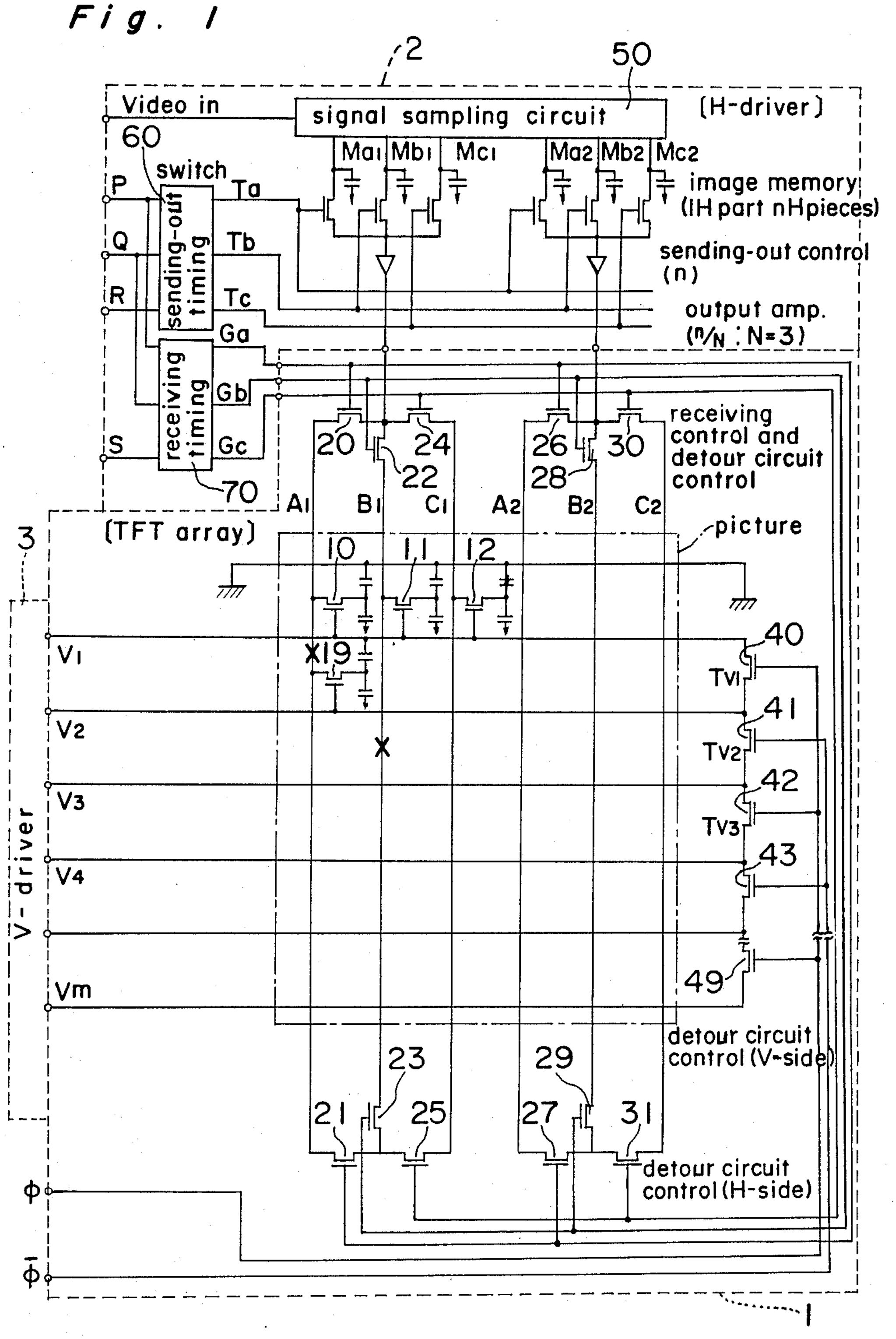
FIG. 1 is a diagram showing in detail the entire structure of a display device according to the present invention.
Figure 2:
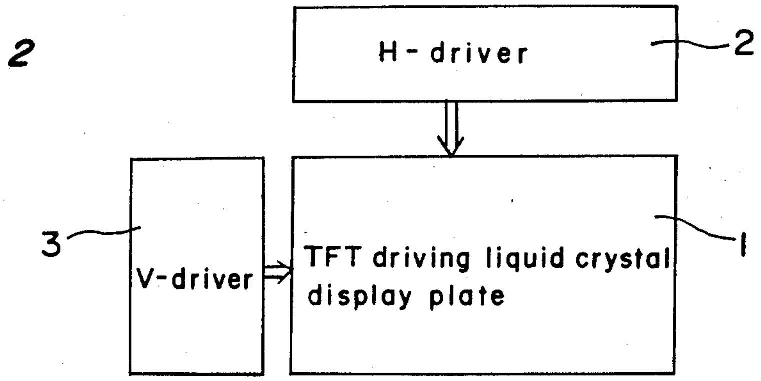
FIG. 2 is a diagram showing the entire structure of the display device according to the present invention.
Figure 3:
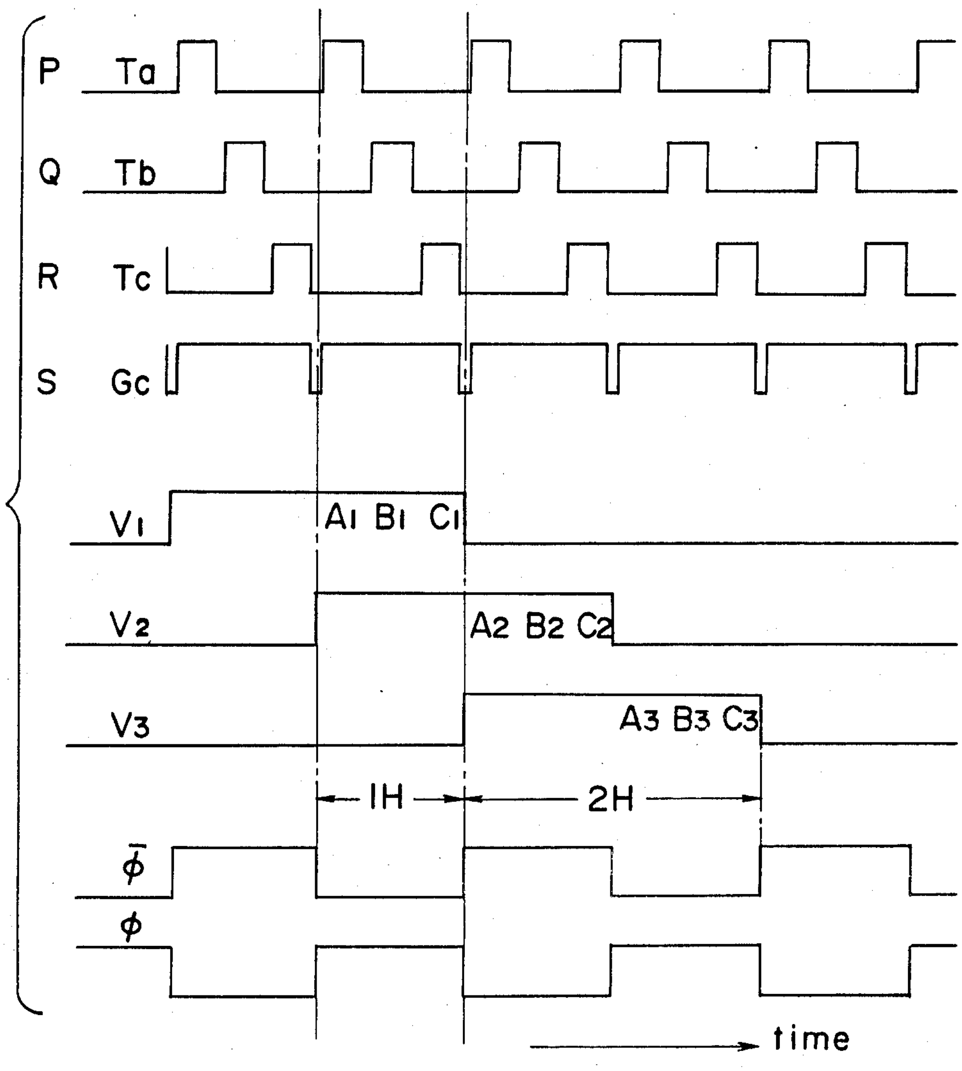
FIG.3 is a timing chart showing waveforms of control signals of the display device according to the present invention.

Referring to FIG. 2, there is shown a diagram showing the entire construction of an essential portion of a display device according to one preferred embodiment of the present invention. FIG. 1 is a more detailed diagram than of FIG. 2, in which a liquid crystal display plate 1 driven by an array of insulated gate thin film transistors (TFTs), an H driver 2 for supplying display signals and a V driver 3 for supplying scanning signals are defined by a dotted line, respectively. FIG. 3 is a timing chart of the waveforms of the control signal in the display device of FIG. 1.

The TFT driven liquid crystal display plate 1 of FIGS. 1 and 2 has its display elements formed in an array by insulated gate TFT's 10–19 which are mainly made of amorphous silicon (used as the semiconductor material) and silicone nitride (used as the gate insulating material) by a normal plasma chemical vapor deposition method. What is different in the display plate 1 of the present embodiment from that of the prior art is that there are provided, in addition to the TFTs 10–19, switch TFTs 20–31, etc. at the opposite ends of the display signal bus lines, while there are provided switch TFTs 40–49 (TV1-), etc. at the opposite ends of the scanning signal bus lines, simultaneously between one bus line and the adjacent two bus lines through the same process used for manufacturing TFT's 10–19. (It is to be noted here that these switch TFTs need not be provided simultaneously with respect to both signal bus lines, but the present invention can display its effect even when the switches are provided only with respect to one of the two signal bus lines.) The operation of the display device according to the present invention by using the above-described switch TFTs and new driving methods will be described in detail.

(a) Transmission of image display signals: at the side of the H driver: (with reference to FIGS. 1 and 3)

A video input signal to the H driver 2, after being sampled in a signal sampling circuit 50, is stored in n memories (Ma1, Mb1, Mc1, Ma2, Mb2, Mc2, etc.) corresponding in number to the picture elements in one scanning time period 1H. It is possible to desirably combine sending-out timing pulse lines P, Q and R which are obtained by dividing one scanning time period 1H into N elements (in this embodiment, N=3) with sending-out control gate lines Ta, Tb and Tc by a sending-out timing switch 60. Each of the image signals bunched every N(=3) duplicity is sent out serially in time from an output amplifier every 1H/N(=3).

On the other hand, in the TFT array, switch TFTs (20–31, etc.) are connected to the opposite ends of each display signal bus line. These switch TFTs are controlled so as to be opened or closed by control lines Ga, Gb and Gc which are connected to input signals P, Q and S through a receiving time switch 70, respectively. The signal S is held at a "1" level except during a horizontal blanking period. When the sending-out timing is switched to the receiving timing, or vice versa, Ta and Ga, Tb and Gb and, Tc and Gc are, in a synchronous relation to each other, are connected to the pulse lines P, Q, R and S.

Referring back to FIG. 1, bus lines A1 and B1 are broken respectively at a point x among groups of display signal bus lines Ai(A1, A2, ...), Bi(B1, B2, ...) and Ci(C1, C2, ...). The group Ci has no defect, that is, no break is observed. In this case, the gate line Gc which controls the transmission of signals to the non-defective group of bus lines Ci is connected to the signal S, with the sending-out control gate line Tc being connected to the signal R in the sending-out timing switch and the receiving timing switch, respectively. Subsequently, Ma1 and Mb1 among signals in the memories are first sent out, and, finally Mc1 which corresponds to the group of non-defective and not-broken bus lines is sent out, during one scanning time period 1H.

Since the gate line Gc controlling TFTs at the opposite ends of the group of bus lines Ci is connected to the signal S which is at a "1" level at all times, the TFTs (24, 25, 30, 31, etc.) connected to the gate line Gc are always kept in the ON state. When the display signals in the memory group Ma are transmitted in the first 20 μsec of 1H, the TFT (20, 21, 26, 27, etc.) at the opposite ends of the group of bus lines Ai controlled by the gate line Ga are also turned ON. Therefore, in the bus lines A1, B1 and C1, the image display signal stored in the memory Ma1 is, through switch TFTs 20, 21, 24, 25, transmitted while tracing a loop formed by the bus lines A1 and C1, and accordingly, the image display signal is correctly transmitted to an input terminal of picture elements TFTs 10 and 19 connected to the bus line A1 wherever the broken point x is positioned. During this time period, a picture element TFT in the corresponding scanning bus line stores the signal in a picture element memory capacitor. After the lapse of the first 20 μsec, the gate line Ga shows a "0", and the TFTs (20, 21, 26, 27, etc.) at the opposite ends of the group Ai are turned OFF. The signal voltage stored in each display element memory capacitor of the group Ai is maintained.

For the next 20 μsec, the same procedure as described above will take place with respect to the groups of bus lines Bi and Ci.

Only the TFTs (24, 25, 30, 31, etc.) of the group Ci connected to the gate line Gc are turned ON in the last 20 μsec. At this time, therefore, there is formed no looped route for transmitting the signals. However, since the group Ci is without any defect, a signal from the memory Mc is directly transmitted entirely from one end to the other end of the bus lines. When the last 20 μsec has passed, the corresponding V scanning pulse indicates a "0", with the picture element TFT being turned OFF. Thus, the image display signal is maintained in one frame by the picture element capacitor.

Although it is stated in the foregoing description that the gate line Gc is kept at a "1" level at all times, if a direct combined voltage of a gate pulse is influenced by the capacity between the gate and the drain of the switch TFTs (20–31, etc.) so much so that it is not negligible with respect to the picture signal transmitted on the subject bus line, it may be so arranged that the gate line Gc is placed at a "0" level for a very short period of time immediately before the V scanning pulse is placed at a "0" level after the last 20 μsec have passed.

As has been described hereinabove, according to the present invention, the TFTs at the opposite ends of the group of bus lines having no defect, selected from among the groups of bus lines Ai, Bi and Ci, are kept at a "0" level at all times, so as to thereby form a detour circuit for a signal. In consequence, if the group of bus lines Ci is not defective, it does not matter whether each of the bus lines in the groups Ai and Bi has one broken point. Similarly, if the group Ai is not defective, it can be so arranged according to the present invention that no trouble occurs even when there is one break in each of the bus lines Bi and Ci since the switch TFTs at the opposite ends of the group of bus lines Ai are always kept ON. The sending-out timing may be determined in combination with the receiving timing, while an image on the screen is being inspected, so that no defect is brought about.

(b) Transmission of scanning signals: at the side of the V driver:

A scanning pulse to be added to a gate signal of the picture element TFT, that is, to the scanning signal side bus lines V1–Vm has a pulse width of 2H in width, which is overlapped by 1H by a scanning pulse of vertically adjacent bus lines, respectively. Furthermore, the bus lines V1–Vm have their respective other ends connected to TFTs 40–49 which are ON/OFF controlled every two TFTs by repetition pulses φ and φ having a pulsewidth of 1H.

Taking note of the latter half of 1H in the scanning signal bus line V1 in FIG. 1, since the bus line V2 is also at a "1" level and the repetition pulse φ is 1, the TFT 40 of TV1 is kept ON. Accordingly, even if the breaking of a bus line takes place at one position in the scanning bus line V1, the scanning signal is transmitted from the bus line V2 through the TFT 40 of TV1. At this time, an image display signal corresponding to the bus line V1 is transmitted. After the latter half of 1H in the bus line V1 has been completed, the TFT 40 of TV1 is turned OFF, and the detour circuit from the bus line V2 to the bus line V1 is interrupted. Therefore, regardless of the occurrence of the break (but, at one position) in the scanning signal bus line V1, a correct gate control signal can be transmitted directly or through the detour circuit.

Embodiment 2

The TFT driving liquid crystal display plate 1 of FIGS. 1 and 2 is constructed in an array of TFTs which are made mainly of polycrystalline silicon and silicon oxide. However, the display plate in the present embodiment is different from that of the Embodiment 1 in that at least switch TFTs 20–31 at the ends of the display signal bus lines among the switch TFTs 20–31 and 40–49 are formed in a phase-interpolation type. Owing to this arrangement, the decrease in the signal voltage between the opposite ends of the TFT which would occur when a signal is passed through the switch TFT in the case of an image display having harmony in the embodiment 1 can be reduced.

As mentioned in the explanation of the above embodiments, the first embodiment is disclosed on the employment of a TFT of the insulating gate type, as the above mentioned switch, including a semiconductor of amorphous silicon and gate insulating film of nitride silicon, and the above switch is formed simultaneously with the same material and construction as those of the TFT employed in the display element. In addition, the second embodiment is disclosed with an example for the manufacturing of a TFT of the display element as well as a TFT of a PN phase compensating type employing a semiconductor of silicon and a gate insulating film of oxidized silicon. Accordingly, the present invention can simultaneously provide, in a simple construction, the abovenoted switch and TFT of a display element, without adding new processes special to this matter.

As has been described above, in accordance with the present invention, a simple switching circuit is provided in the outer periphery of the display part so as to control the signal to be detoured for transmission. Accordingly, by applying the signal in duplicate, the original signal to be displayed can be correctly transmitted to the right display picture element even when the bus line is broken. Thus, the present invention enables the right display at the right position. As a result, a bad influence caused by the breaking of the bus line which is a fatal defect for an image display device can be prevented, resulting in a significant improvement in the yield rate of the display device which can consequently be manufactured at a low cost and in large volume.

Moreover, with respect to the connection of the display device of the present invention with the marginal circuit, the number of the connection mountings is reduced, and the mounting pitch is increased. Accordingly, the display device of the present invention is advantageously highly improved in the mounting reliability. Furthermore, the display device also has such merits that the number of ICs necessary for driving the display device is rendered small, thereby lowering the material cost therefor.

Hereinbelow, the advantageous effects achieved by the display device of the present invention will be described more in detail.

(A) Expected improvement in the yield rate:

Now, the probability of the improvement in the yield rate when the display device of the present invention is employed, together with the additional effects described above will be observed from the statistical viewpoint.

In the prior art linear sequence matrix display device of simple construction, if there is a break in a bus line, even a single break in of groups of bus lines, then the broken bus line appears as a line defect in the actual display, and therefore, the display device must be regarded as a defective product. On the contrary, according to the present invention, a break in a bus line gives little influence upon the display device, which will be discussed statistically hereinbelow.

(a) Influence by the breaking of a source bus line:

A duplicate efficiency is generally indicated by N (an integer). Bus lines which are n in total number are divided into N groups, in which groups r broken source bus lines are distributed. In the case that one group selected from among these N groups is without a defect, an influence by the breaking of the bus line can be prevented as has been described earlier. In the prior art linear sequence display device, the duplicate efficiency N is 1, while in the present invention, N>2 is established.

This corresponds to the probability obtained when one of N boxes has no ball although r balls are put into N boxes.

(b) Influence of the breaking of a gate bus line:

The condition in which an n linear defect appears on the image is that no break of the bus line occurs simultaneously in each of the two successive bus lines. A display device having 240 scanning bus lines, with s broken bus lines thereamong, corresponds to the probability obtained when the successive two of the 240 boxes have no ball although s balls are put into the 240 boxes.

Figure 4A:
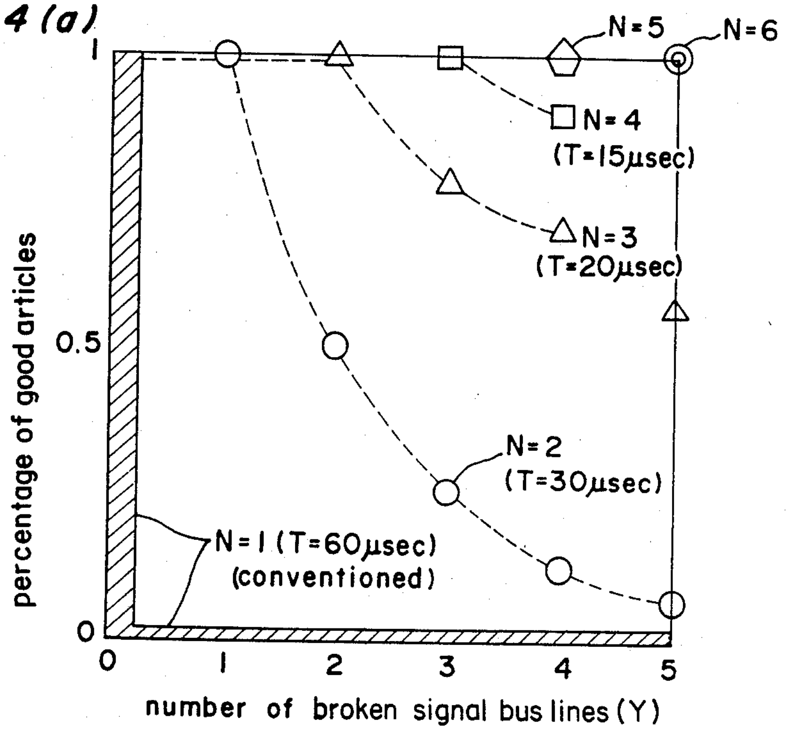
FIGS. 4(*a*)-4(*b*) are graphs showing the statistical probability of the yield rate accomplished by the display device according to the present invention, FIG. 4(*a*) being a graph in the case that a signal bus is broken (N=1: prior art, N>1: present invention), and FIG. 4(*b*) being a graph in the case that a scanning bus is broken.
Figure 4B:
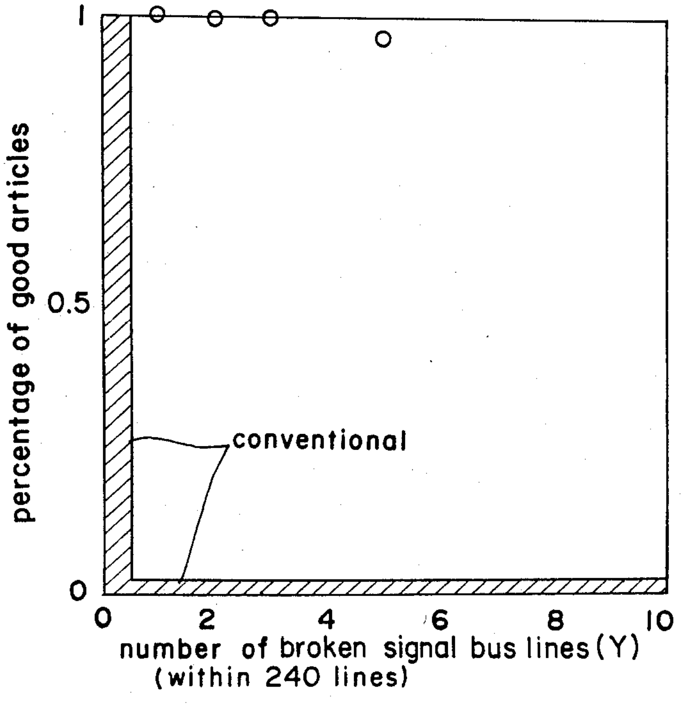

Referring to FIG. 4, there are illustrated graphs showing the difference in the number of broken bus lines and the percentage of good articles between the display device of the present invention and the prior art linear sequence display device. FIG. 4(*a*) is a graph showing the influence of the breaking of the source bus line, and FIG. 4(*b*) is a graph showing the influence of the breaking of the gate bus line, both indicated as a result from the above statistical study.

(B) Effect in the mounting

In FIG. 1, the number of connections between the H driver and the TFT array is (n/N)+3, which in turn means that the mounting pitch becomes as large as N times. In a high-density display plate in 5-inch for displaying 640 horizontal trios, the mounting pitch is 50 μm, and the number of the mountings is as large as 1920 even when the connection mountings only at the driver side are taken into consideration, according to the prior art. On the other hand, according to the present invention, in the above high-density display plate, the number of mountings is reduced to ⅓ as compared with that in the prior art. Accordingly, the mounting pitch can be as much as 3 times of that of the prior art, namely, 150 μm. Therefore, it is highly advantageous from the viewpoint of the mounting reliability that the number of mountings can be reduced, and at the same time, the mounting density can be lowered.

(C) Material cost: reduction in the number of driving ICs

At present, the number of IC chips necessary for an integrated circuit of simple inner construction such as the H driver is determined by the number of its input and output terminals. Therefore, since the number of output circuits is reduced to ⅓ in the present invention, the number of necessary H drivers can be reduced to ⅓ in comparison with that of the prior art, resulting in an effective reduction in the material cost.

In summary the present invention is promising in that the yield rate of the display device itself can be remarkably improved, the reliability including the mounting reliability can be improved, and moreover, the material cost can be reduced. The display device of the present invention is therefore able to be manufactured at a low cost and in large volume.

Although the foregoing embodiments of the present invention have been described only with respect to the case of a thin film transistor made of amorphous silicon and polycrystalline silicon, the present invention may be applicable to a thin film transistor made of other monocrystalline or polycrystalline semiconductor material. Likewise, although the foregoing description is limited to the case where the switch TFT is disposed in the outer periphery of the display part, the switch TFT can be placed, upon necessity, in the display screen part. Moreover, the present invention is not necessarily limited to the liquid crystal display plate as has been so described in the foregoing embodiments, but may be applicable to an EL display plate or other matrix display plate.

What is claimed is:

1. A display device comprising:

a first group of bus lines for transmitting display signals;

a second group of bus lines for transmitting scanning signals;

display units formed so as to correspond to each intersecting point between said bus lines of said first group and second group, wherein said bus lines of said first group are divided into a plurality of smaller groups each including N plural bus lines, (N≧2), which are adjacent to each other; and a first switch means which is freely operable so as to be on and off and which is disposed so as to connect a particular bus line of said smaller group to at least one other bus line of said smaller group, and a second switch means which is freely operable so as to be on and off and which is disposed so as to connect a particular bus line of said second group and another bus line of said second group which is positioned adjacent to said particular bus line; and wherein during a first interval, all of said switch means for said smaller group are actuated and for each subsequent interval, the number of actuated switch means is reduced by one with the last of said actuated switch means being held on all of the time.

2. A display device as claimed in claim 1, wherein said device further comprises a third switch means which is freely operable so as to be on and off and which is disposed so as to connect one end of a particular bus line of said smaller group and another end of at least one other bus line of said smaller group.

3. A display device as claimed in claim 1, wherein said switch means is an insulated gate transistor.

4. A display device as claimed in claim 1, wherein said switch means is a thin film transistor.

5. A display method comprising the steps of transmitting display signals to bus lines of a first group, transmitting scanning signals to bus lines of a second group and driving, using both the display and scanning signals, display units formed so as to correspond to each intersecting point between said bus lines of the first and second groups, wherein the bus lines of the first group are divided into a plurality of smaller groups each constituting a unit including N plural bus lines, (N≧2), being adjacent to each other, and, in order to transmit a signal which has been transmitted from one end of a particular bus line in the smaller group of bus lines to another bus line of the smaller group of bus lines, the ON and OFF operation of a switch means provided between the particular bus line of the smaller group of bus lines, and another bus line of the smaller group is controlled, and the display signals are loaded integrally at the same time onto the particular bus line of the smaller group of bus lines and at least one other bus line of the smaller group of bus lines; and wherein during a first interval, all of said switch means for said smaller group are actuated and for each subsequent interval, the number of actuated switch means is reduced by one with the last of said actuated switch means being held on all of the time.

6. A display method as claimed in claim 5, wherein the display signals are divided into a plurality of sets each including N display signals, (N≧2), and the display signals of the respective set are transmitted onto a displaying portion at every 1/N times for one scanning period of time during which the scanning signals are transmitted.

* * * * *